(12) United States Patent
Kim et al.

(10) Patent No.: US 8,340,129 B2
(45) Date of Patent: Dec. 25, 2012

(54) METHOD FOR COMPRESSING A REAL-TIME TRANSPORT PROTOCOL HEADER EXTENSION FIELD

(75) Inventors: Sung-Kee Kim, Hwaseong-si (KR);
Tae-Sung Park, Suwon-si (KR);
Jae-Hoon Kwon, Seongnam-si (KR);
Do-Young Joung, Seoul (KR); Jae-Sung Park, Gunpo-si (KR); Yong-Gyoo Kim, Seoul (KR); Ji-Wan Song, Seoul (KR)

(73) Assignee: Samsung Electronics Co., Ltd (KR)

( * ) Notice: Subject to any disclaimer, the term of this patent is extended or adjusted under 35 U.S.C. 154(b) by 322 days.

(21) Appl. No.: 12/533,599

(22) Filed: Jul. 31, 2009

(65) Prior Publication Data

US 2010/0027566 A1 Feb. 4, 2010

(30) Foreign Application Priority Data

Aug. 1, 2008 (KR) .................. 10-2008-0075663

(51) Int. Cl.
*H04J 3/16* (2006.01)

(52) U.S. Cl. ........................... 370/471; 370/477

(58) Field of Classification Search .............. 370/310, 370/345, 349, 464, 465, 470, 471, 474, 477
See application file for complete search history.

(56) References Cited

U.S. PATENT DOCUMENTS

| 7,002,993 | B1 * | 2/2006 | Mohaban et al. | 370/471 |
|---|---|---|---|---|
| 2002/0136291 | A1 * | 9/2002 | Sala et al. | 375/240 |
| 2004/0039830 | A1 * | 2/2004 | Zhang et al. | 709/230 |
| 2004/0264468 | A1 * | 12/2004 | Horton et al. | 370/392 |
| 2005/0094647 | A1 * | 5/2005 | Hata et al. | 370/395.52 |

FOREIGN PATENT DOCUMENTS

KR 1020020017291 3/2002

* cited by examiner

*Primary Examiner* — Obaidul Huq
(74) *Attorney, Agent, or Firm* — The Farrell Law Firm, P.C.

(57) ABSTRACT

A method for compressing an extension field to be selectively included in a Real-time Transport Protocol (RTP) header is provided. It is determined whether an RTP header extension field is included in the RTP header. Information indicating a determination result is recorded. Profile information of the RTP header extension field is recorded. Total length information of the RTP header extension field is recorded. Information indicating whether changed data exists is recorded using a header extension information map.

8 Claims, 8 Drawing Sheets

METHOD FOR COMPRESSING A REAL-TIME TRANSPORT PROTOCOL HEADER EXTENSION FIELD

PRIORITY

This application claims priority under 35 U.S.C. §119(a) to a Korean Patent Application filed in the Korean Intellectual Property Office on Aug. 1, 2008 and assigned Ser. No. 10-2008-0075663, the disclosure of which is incorporated herein by reference.

BACKGROUND OF THE INVENTION

1. Field of the Invention

The present invention relates generally to a method for compressing a header included in a general communication packet, and more particularly, to a method for compressing a header by RObust Header Compression (ROHC).

2. Description of the Related Art

A header compression method has been proposed to more efficiently utilize radio resources when a multimedia service is used in a wireless environment having limited available bandwidth. The transmission of essential items is provided without an invariable item in every packet transmission or a fixed value in protocol headers (Internet protocol (IP), user datagram protocol (UDP), and real-time transport protocol (RTP) headers, etc.) used for real-time multimedia service transmission. As a result of this effort, data that is to be repeatedly transmitted through a header may be reduced.

A representative header compression method is an ROHC method described in Internet Engineering Task Force (IETF) Request For Comments (RFC) 3095. According to this method, a header to be used in each protocol may be reduced remarkably. Specifically, an (IP+UDP+RTP) header basically needs 40 bytes, but may be transmitted using only an average of several bytes by removing data that is transmitted repeatedly and transmitting only specific items.

RTP has a 12-byte basic header size when used as a protocol in real-time multimedia data transmission. RTP provides a header extension in which additional information may be transmitted with the basic header. When RTP was designed, an RTP header extension was not used actively. However, there has recently been an increase in the use of the RTP header extension to provide an additional service. In an RTP standard, only a basic frame is defined, but a use method totally depends on a user. Attempts are being made to solve a problem occurring in the use of the RTP header extension. In the RTP standard, a header extension field 20 capable of transmitting additional information is provided in addition to a 12-byte basic header 10 as illustrated in FIG. 1. For use of the RTP header extension field, a specific bit provided to identify the use of the header extension field 13 (for example, x-bit as a flag indicating the use of the extension header) is set to "1". The header extension field 20 is inserted after the RTP basic header 10. The header extension field 20 includes a 2-byte profile item (identification information) field 21, a 2-byte length item field 22, and a header extension body 23 into which actual data is inserted.

A header extension field may be used in a data packet using the ROHC method, but the extension field is not specially compressed. Accordingly, when the header extension field is used, header compression efficiency achieved by using the ROHC method may be degraded.

Use of the RTP header extension field is gradually increasing and the RTP header extension field is being used for various purposes.

SUMMARY OF THE INVENTION

The present invention has been made to address at least the above problems and/or disadvantages and to provide at least the advantages described below. Accordingly, an aspect of the present invention provides a method for compressing a header included in a data packet and an extension field provided in the header through ROHC.

According to one aspect of the present invention, a method is provided for compressing an extension field to be selectively included in an RTP header. It is determined whether an RTP header extension field is included in the RTP header and information indicating a determination result is recorded. Profile information of the RTP header extension field is recorded. Total length information of the RTP header extension field is recorded Information indicating whether changed data exists is recorded using a header extension information map.

A data field provided in the extension field may include data to be transmitted in the extension field and a data chunk field having information about a length of the data. The method may also determine whether at least one of data to be transmitted in the extension field and information about a length of the data is recorded in the data chunk field and record a determination result in a header extension information map.

The header extension information map may record at least one information element selected from information indicating that all data chunk fields are included, information indicating that all the data chunk fields are not included, and information indicating that only data to be transmitted in the extension field is transmitted.

The method may further record information indicating whether the header extension information map is recorded in a data field provided in the extension field.

The information indicating whether the header extension information map is recorded may include at least one information element selected from information indicating that both the header extension information map and the data chunk field are included, information indicating that neither the header extension information map nor the data chunk field is included, and information indicating that only a data chunk is included.

The profile information of the extension field may be defined and recorded in a STATIC class, and the total length information of the extension field may be defined and recorded in a CHANGING class.

In recording the total length information of the extension field, the total length information of the extension field may be omitted when the total length information of the extension field is the same as that included in a previously transmitted frame. The total length information may be recorded only when the total length information of the extension field is set to be different from that included in the previously transmitted frame.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Figure 1:
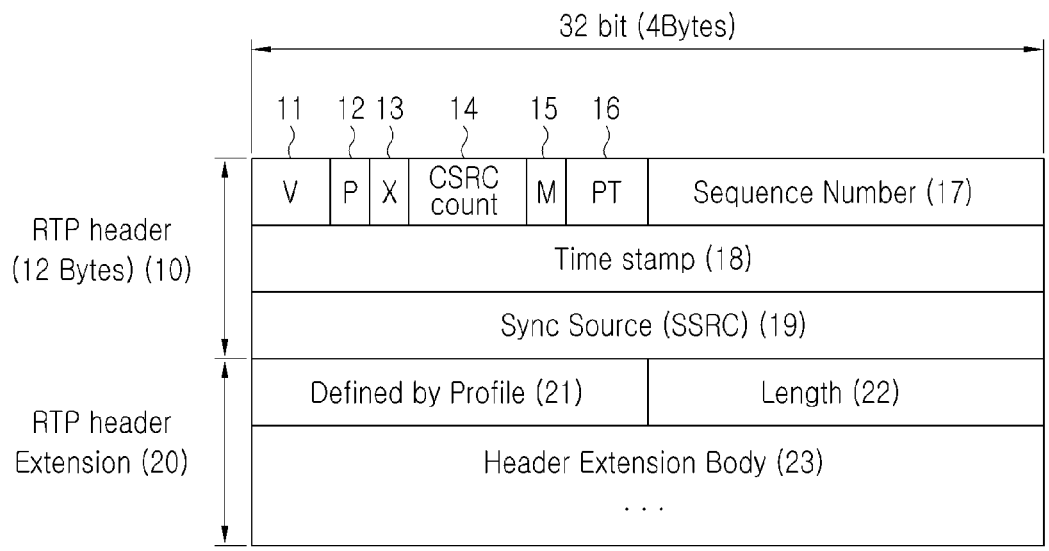
FIG. 1 is a structural diagram of a conventional RTP header.

Preferred embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Figure 2A:
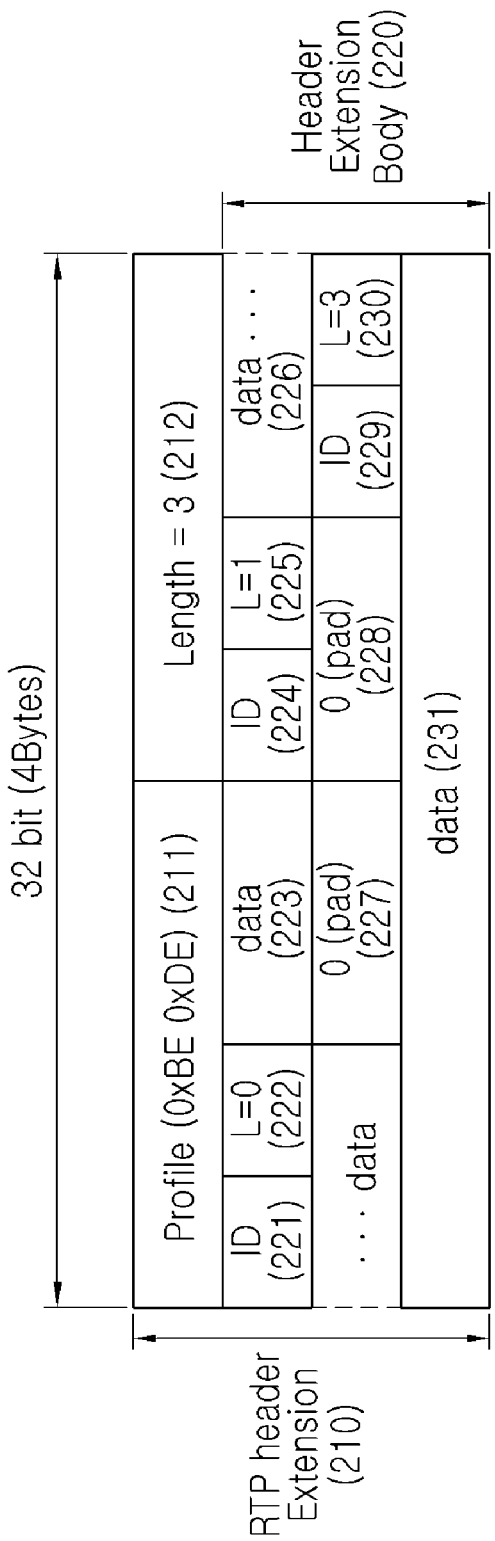
FIGS. 2A and 2B are diagrams illustrating an extension field provided in the conventional RTP header.
Figure 2B:
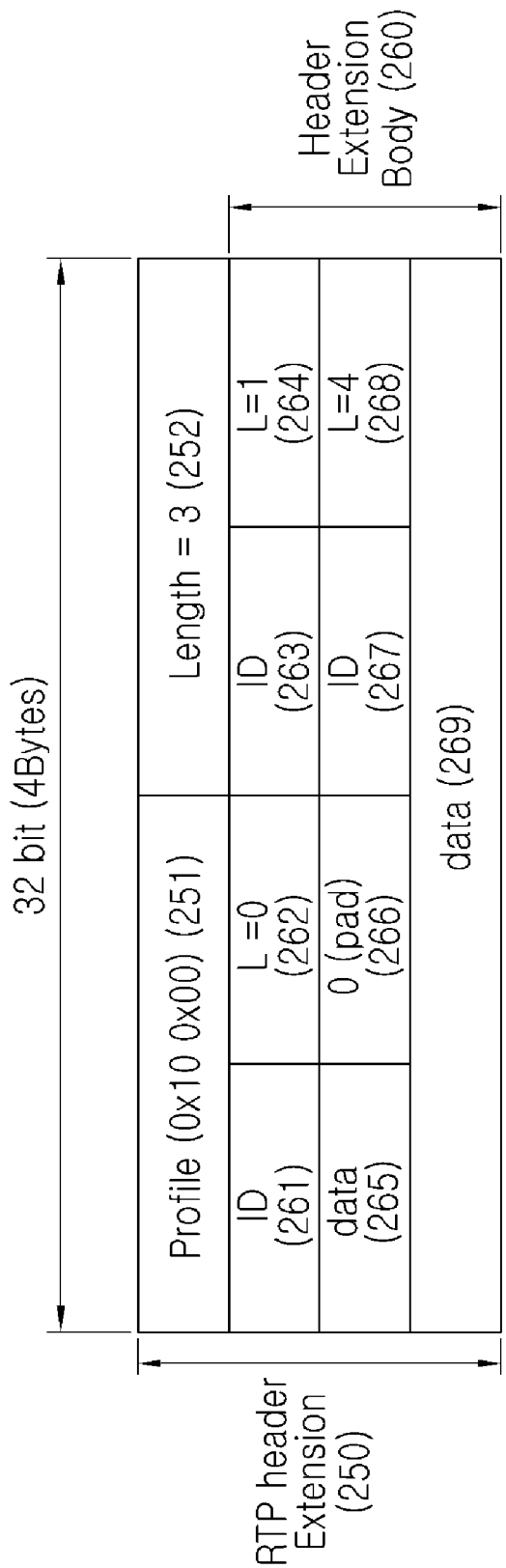

FIGS. 2A and 2B are diagrams illustrating extension fields (RTP header extension fields) provided in the conventional RTP header.

Referring to FIG. 2A, an extension field 210 includes a profile field 211, a total length field 212 in which information about a length of total data included in the extension field 210 is recorded, and a header extension body 220. The header extension body 220 includes one or more data chunk fields 223, 226, and 231 in which actual data included in the extension field is recorded. The header extension body 220 also includes identifier (ID) fields 221, 224, and 229 for identifying the data chunk fields 223, 226, and 231, and individual length fields 222, 225, and 230 indicating information about lengths of the data chunk fields 223, 226, and 231. The ID fields 221, 224, and 229 and the individual length fields 222, 225, and 230 indicating information of the data chunk fields 223, 226, and 231 are constituted by a 1-byte header.

Similarly, FIG. 2B illustrates an extension field 250 including a profile field 251, a total length field 252, and a header extension body 260. The header extension body 260 includes a plurality of data chunk fields 265 and 269, and ID fields 261, 263, and 267 and individual length fields 262, 264, and 268 in which header information about the plurality of data chunk fields 265 and 269 is recorded. Unlike FIG. 2A, the ID fields 261, 263, and 267 and the individual length fields 262, 264, and 268 are constituted by a 2-byte header.

In an embodiment of the present invention, a method is provide that is capable of efficiently compressing information recorded in a header extension field by removing information to be repeatedly recorded in the header extension field in consideration of a characteristic of each field included in the above-described header extension field.

According to an embodiment of the present invention, a header compression method can be applied to an ROHC device or layer.

Figure 3:
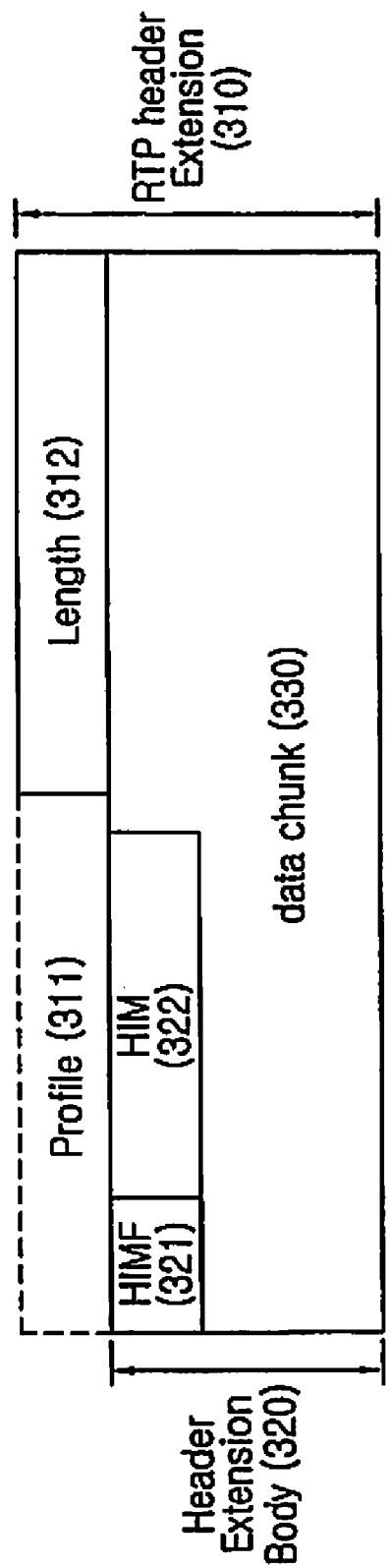
FIG. 3 is a structural diagram of an RTP header extension field generated by a header compression method, according to an embodiment of the present invention.

FIG. 3 illustrates a structure of an RTP header extension field generated by a header compression method, according to an embodiment of the present invention. Referring to FIG. 3, an RTP header extension field 310 generated by the header compression method includes a total length field 312 and a header extension body 320.

First, referring to a structure of the conventional header extension field illustrated in FIGS. 2A and 2B, the profile fields 211 and 251 provided in the extension fields 210 and 250 generally maintain the same value in the same session. It is preferable that the profile fields 211 and 251 are not repeatedly recorded and transmitted in a data packet, but are transmitted through a packet to be transmitted in an initial state of a session. According to an embodiment of the present invention, the RTP header extension field generated by the header compression method does not include a profile field 311, and is defined in an ROHC "STATIC" class. A profile value of the header extension is transmitted in an ROHC initial state, but is not transmitted thereafter.

The total length field (indicated by reference numeral 212 of FIG. 2A or reference numeral 252 of FIG. 2B) is usually transmitted during one session, but this may change. Thus, it is preferable for the total length field 312 to not be repeatedly recorded and transmitted, but transmitted only when its value changes. According to an embodiment of the present invention, the RTP header extension field generated by the header compression method includes the total length field 312, but this field is not included in all packets. The total length field 312 is selectively included only when its value changes. That is, the total length field 312 is defined in an ROHC "CHANGING" class, and included in the RTP header extension field only when a value recorded in the total length field 312 changes without being repeatedly recorded and transmitted in a data packet.

In general, the ID fields and the individual length fields included in the header extension body (indicated by reference numeral 210 of FIG. 2A or reference numeral 260 of FIG. 2B) can be changed by data recorded in the extension field. Accordingly, it is required that the ID fields and the individual length fields not be defined in separate classes and information included in the ID fields and the individual length fields be properly recorded in the header extension field.

In the header compression method according to an embodiment of the present invention, header information and data included in the header extension body are compressed using a header information map.

According to an embodiment of the present invention, a header extension body 320 generated by the header compression method includes a Header extension Information Map Flag (HIMF) field 321, a Header extension Information Map (HIM) field 322, and a data chunk field 330.

The HIMF field 321 records information about whether the HIM field 322 and the data chunk field 330 are included in the header extension body 320. For example, the HIMF field 321 can be constituted by 2 bits and have a value shown in Table 1 below.

TABLE 1

| HIMF Value | Indication Information |
| --- | --- |
| 00 | The HIM field 322 and the data chunk field 330 are not included. |
| 01 | The HIM field 322 is included and the data chunk field 330 is not included. |
| 10 | The HIM field 322 and the data chunk field 330 are included. |
| 11 | reserved |

The header extension body 320 can include a plurality of data blocks. A data block included in a current data packet can have the same value as that included in the header extension body 320 of a previously transmitted data packet.

Figure 4:
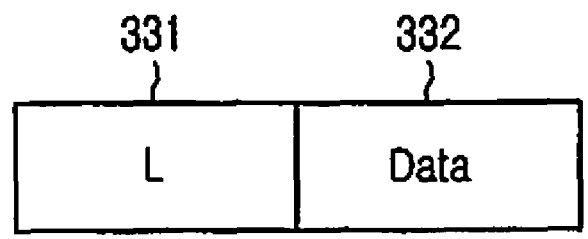
FIG. 4 is a structural diagram of a data chunk field of FIG. 3.

According to an embodiment of the present invention, the data chunk field 330 is constituted by an individual length field 331 and a data field 332, as shown in FIG. 4. The HIM field 322 is generated by including only information about whether the individual length field 331 and/or the data field 332 included in a current data packet are the same as the individual length field 331 and/or the data field 332 of the header extension body 320 of a previously transmitted data packet.

Figure 5:
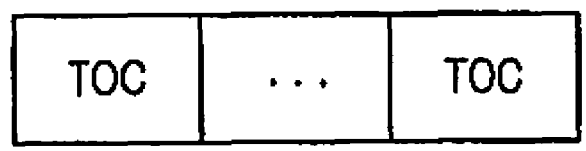
FIG. 5 is a structural diagram of a Header extension Information Map (HIM) field of FIG. 3.

Specifically, the HIM field 322 includes Table-Of-Content (TOC) fields whose number corresponds to the number of data blocks to be transmitted through a data packet, as shown in FIG. 5. The TOC fields are not assigned special IDs for identifying data blocks, and are arranged according to a sequence of data blocks to be transmitted through the data packet. For example, when the number of data blocks to be transmitted through the data packet is "3", the HIM field 322 includes three TOC fields, which are arranged according to a sequence of the three data blocks.

Each TOC field records information about whether the individual length field 331 and the data field 332 corresponding to the data block are included in the header extension body 320. For example, the TOC field is constituted by 2 bits and has a value as shown in Table 2 below.

TABLE 2

| TOC Value | Indication Information |
|---|---|
| 00 | Neither the individual length field 331 nor the data field 332 is transmitted. |
| 01 | The individual length field 331 is not transmitted and only the data field 332 is transmitted. |
| 10 | Both the individual length field 331 and the data field 332 are transmitted. |
| 11 | reserved |

According to the TOC field of the HIM field 322 set as described above, the individual length field 331 corresponding to the data block is not included in the header extension body 320 when it is the same as the individual length field 331 included in the header extension body 320 of a previously transmitted data packet. The individual length field 331 is selectively included in the header extension body 320 only when it is different from the individual length field 331 included in the header extension body 320 of the previously transmitted data packet. Similarly, the data field 332 is selectively included in the header extension body 320 only when it is different from the data field 332 included in the header extension body 320 of the previously transmitted data packet.

As described above, the RTP header extension field generated by the header compression method according to the embodiment of the present invention includes only set information different from that of a previously transmitted data packet without generating and transmitting the same information as that of the previously transmitted data packet. When the RTP header extension field is generated and transmitted according to the embodiment of the present invention, a device receiving the RTP header extension field determines that information excluded from the RTP header extension field is set to be the same as that of the previously transmitted data packet, and uniformly recovers the information included in the previously transmitted data packet. Accordingly, a data size of the RTP header extension field can be reduced effectively.

Hereinafter, a header compression method according to an embodiment of the present invention will be described with a method for generating an RTP header extension field according to an embodiment of the present invention.

1) Initial State

Since a previously transmitted data packet does not exist in an initial state, an RTP header extension field is generated by including all information elements to be transmitted without special compression. That is, a header extension profile value is defined and stored in a "STATIC" class. A total length of the RTP header extension field is defined and stored in a "CHANGING" class. Next, the HIMF field 321 is set and stored so that both the HIM field 322 and the data chunk field 330 are included in the header extension body 320. For example, the HIMF field 321 is set to "10".

A memory is assigned by determining the number of data blocks to be transmitted in the RTP header extension field, and the number of TOC fields included in the HIM field 322 is set by considering the number of data blocks. The TOC field includes information about both the individual length field 331 and the data field 332. For example, all the TOC fields of the HIM field 322 are set to "10". The data chunk field 330 is generated by sequentially including the individual length field 331 and the data field 332 corresponding to the data block.

When a data packet including the RTP header extension field generated as described above is transmitted to a reception end, the reception end acquires and stores information included in the RTP header extension field in the memory.

2) Compression State

The RTP header extension field is generated by recording only different information between a previously transmitted data packet and a packet to be transmitted currently in a compression state.

Specifically, a total length of the RTP header extension field is checked. Information recorded in the total length field 312 of the RTP header extension field of the previously transmitted data packet is checked. When a value of the total length is the same as the check result, the total length field 312 is not included in the RTP header extension field 310. The total length field 312 is selectively inserted into the RTP header extension field 310 only when the total length value is different.

Next, information recorded in the data field 332 and individual length information of the data field 331 is checked. Information recorded in the individual length field 331 and the data field 332 of the RTP header extension field of the previously transmitted data packet is checked. When information to be recorded in the individual length field 331 and/or the data field 332 is the same as that recorded in the individual length field 331 and/or the data field 332 of the RTP header extension field of the previously transmitted data packet, information indicating the same is recorded in the TOC field of the HIM field 322. For example, when information recorded in both the individual length field 331 and the data field 332 is the same, the TOC field is set to "00". When information recorded in the individual length field 331 is the same and information recorded in the data field 332 is different, the TOC field is set to "01". When information recorded in both the individual length field 331 and the data field 332 is different, the TOC field is set to "10".

Figure 6A:
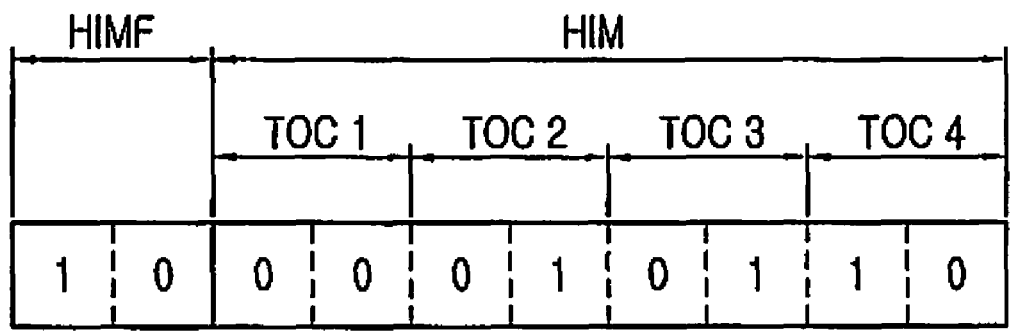
FIGS. 6A and 6B are diagrams illustrating header extension bodies set by a header compression method, according to an embodiment of the present invention.
Figure 6B:
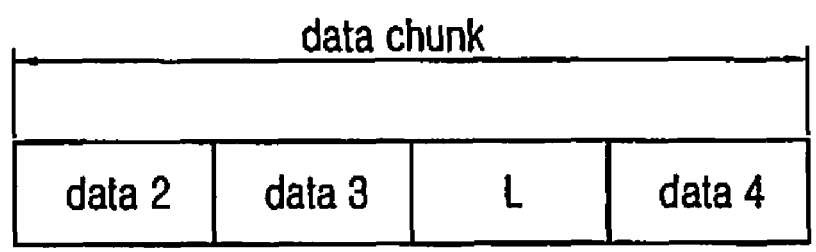

FIGS. 6A and 6B are examples of the header extension body 320 set by a header compression method according to an embodiment of the present invention.

A value of the HIM field 322 and a value of the data chunk field 330 are set to be different from those included in a previous data packet. Four data blocks (for example, first, second, third, and fourth data blocks) are transmitted in a data packet. The data block has the to same value as information included in the previous data packet, and the second, third, and fourth data blocks have different values from information included in the previous data packet as a result of checking information included in the previous data packet. Information about individual lengths of the second and third data blocks is the same as that included in the previous data packet, and information about an individual length of the fourth data block has a different value from that included in the previous data packet.

Accordingly, referring to FIG. 6B, the data chunk field 330 does not include information about the first data block, and includes only information about the second, third, and fourth data blocks. Information about the individual lengths of the second and third data blocks is not included, and only information about the individual length of the fourth data block is included.

As shown in FIG. 6A, TOC1 of the HIM field 322 is set to "00" indicating that neither the individual length field 331 nor the data field 332 is recorded, TOC2 and TOC3 are set to "01" indicating that only the data field 332 is recorded without the individual length field 331, and TOC4 is set to "10" indicating that both the individual length field 331 and the data field 332 are recorded.

The HIMF field 321 is set to "10" indicating that both the HIM field 322 and the data chunk field 330 are included.

Figure 7A:
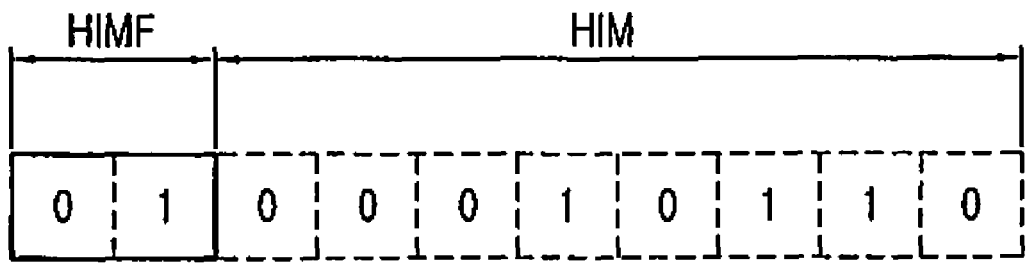
FIGS. 7A and 7B are diagrams illustrating additional header extension bodies set by a header compression method, according to an embodiment of the present invention.
Figure 7B:
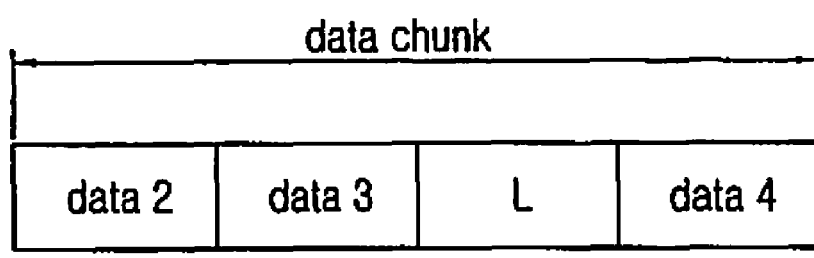

Assuming that the same setting as in the above-described environment is made and a value of the HIM field 322 is set to be the same as that included in a previous data packet, the HIMF field 321 is set to "01" indicating that the HIM field 322 is not included and only the data chunk field 330 is included as illustrated in FIG. 7A, and the HIM field 322 does not include special information. The data chunk field 330 is set as illustrated in FIG. 7B.

Figure 8A:
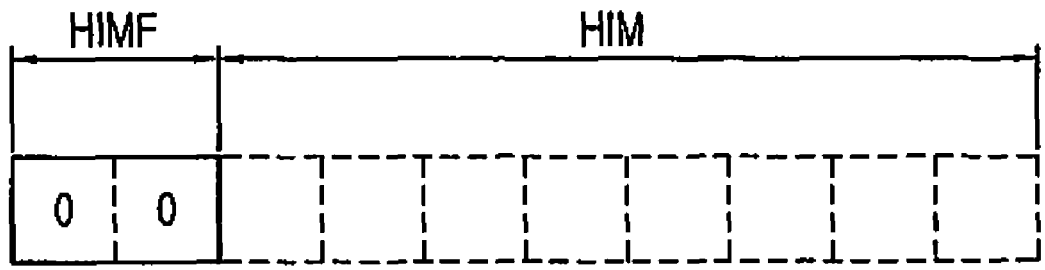
FIGS. 8A and 8B are diagrams illustrating further header extension bodies set by a header compression method, according to an embodiment of the present invention.
Figure 8B:
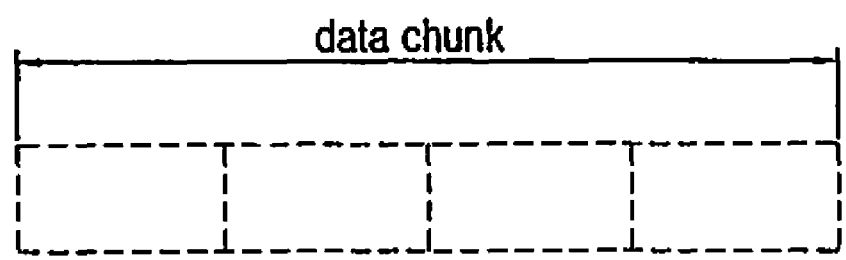

Assuming that values of the HIM field 322 and the data chunk field 330 is set to be the same as those included in a previous data packet, the HIMF field 321 is set to "00" indicating that neither the HIM field 322 nor the data chunk field 330 is included as illustrated in FIG. 8A, and the HIM field 322 does not include special information. Also, the data chunk field 330 does not include special information as illustrated in FIG. 8B.

When a data packet including the RTP header extension field generated as described above is transmitted to a reception end, the reception end acquires and stores information included in a newly transmitted RTP header extension field in a memory. A newly transmitted data is applied to an RTP header extension field. When a field value is not transmitted, data is recovered by acquiring a value recorded in each field of a previous data packet.

According to an embodiment of the present invention, an RTP header compression method can efficiently compress information recorded in a header extension field by removing information to be repeatedly recorded in the header extension field in consideration of a characteristic of each field included in the header extension field.

It is obvious that an RTP header compression method according to an embodiment of the present invention can be realized by hardware, software (i.e., a program), or a combination thereof. This program can be stored in a volatile or nonvolatile recording medium readable by a machine such as a computer. This medium can be a storage device such as a Read-Only Memory (ROM), a memory such as a Random-Access Memory (RAM), a memory chip, or an integrated circuit, or an optical or magnetic recording medium such as a Compact Disk (CD), a Digital Versatile Disk (DVD), a magnetic disk, or a magnetic tape.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. A method for compressing an extension field to be selectively included in a Real-time Transport Protocol (RTP) header, comprising the steps of:
   determining whether an RTP header extension field is included in the RTP header and recording information indicating a determination result;
   recording profile information of the RTP header extension field;
   recording total length information of the RTP header extension field; and
   recording, using a header extension information map, information indicating whether a current frame to be transmitted includes changed data than that included in a previously transmitted frame,
   wherein recording the total length information of the RTP header extension field comprises:
   checking if the total length information of the RTP header extension field included in the current frame to be transmitted matches that included in the previously transmitted frame;
   omitting the total length information of the RTP header extension field, when the total length information of the RTP header extension field matches that included in the previously transmitted frame; and
   recording the total length information, only when the total length information of the RTP header extension field is set to be different from that included in the previously transmitted frame.

2. The method of claim 1, wherein a data field provided in the RTP header extension field comprises data to be transmitted in the RTP header extension field and a data chunk field in which information about a length of the data, and the method further comprises:
   determining whether at least one of data to be transmitted in the RTP header extension field and information about a length of the data is recorded in the data chunk field and recording a determination result in the header extension information map.

3. The method of claim 2, wherein the header extension information map records at least one information element selected from information indicating that all data chunk fields are included, information indicating that all the data chunk fields are not included, and information indicating that only data to be transmitted in the RTP header extension field is transmitted.

4. The method of claim 2, further comprising:
   recording information indicating whether the header extension information map is recorded in a data field provided in the RTP header extension field.

5. The method of claim 4, wherein the information indicating whether the header extension information map is recorded comprises at least one information element selected from information indicating that both the header extension information map and the data chunk field are included, information indicating that neither the header extension information map nor the data chunk field is included, and information indicating that only the data chunk field is included.

6. The method of claim 1, wherein the profile information of the RTP header extension field is defined and recorded in a STATIC class.

7. The method of claim 1, wherein the total length information of the RTP header extension field is defined and recorded in a CHANGING class.

8. A non-transitory computer-readable recording medium for recording a program to execute a method for compressing an extension field to be selectively included in a Real-time Transport Protocol (RTP) header extension field header, the method comprising the steps of:
- determining whether an RTP header extension field is included in the RTP header and recording information indicating a determination result;
- recording profile information of the RTP header extension field;
- recording total length information of the RTP header extension field; and
- recording, using a header extension information map, information indicating whether a current frame to be transmitted includes changed data than that included in a previously transmitted frame, wherein recording the total length information of the RTP header extension field comprises:
- checking if the total length information of the RTP header extension field included in the current frame to be transmitted matches that included in the previously transmitted frame;
- omitting the total length information of the RTP header extension field, when the total length information of the RTP header extension field matches that included in the previously transmitted frame; and
- recording the total length information, only when the total length information of the RTP header extension field is set to be different from that included in the previously transmitted frame.

* * * * *